July 19, 1949.  W. F. HINES ET AL  2,476,603
TERMINAL SEALING CAP FOR REFRIGERATORS
Filed April 12, 1946
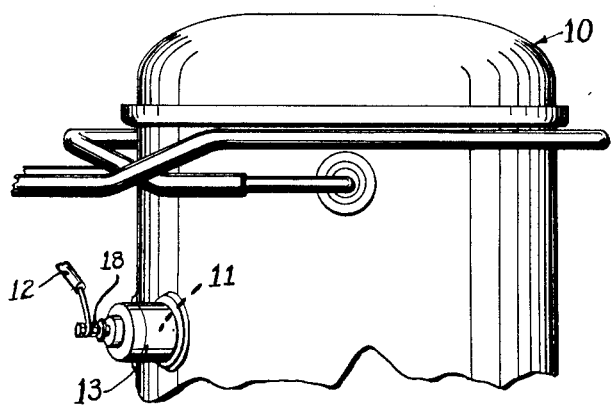
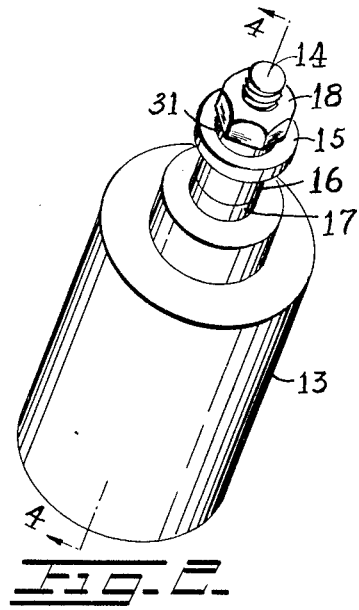
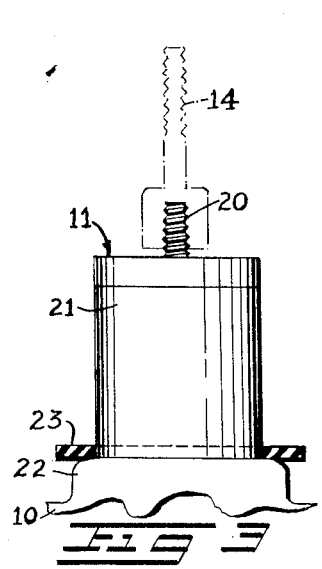
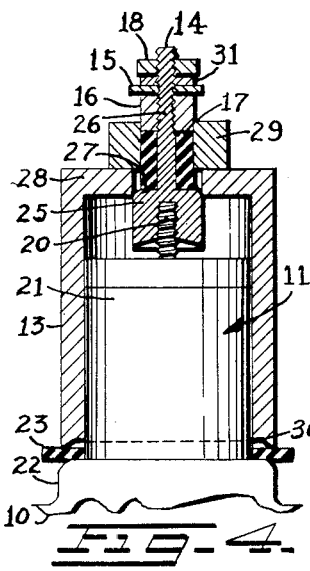
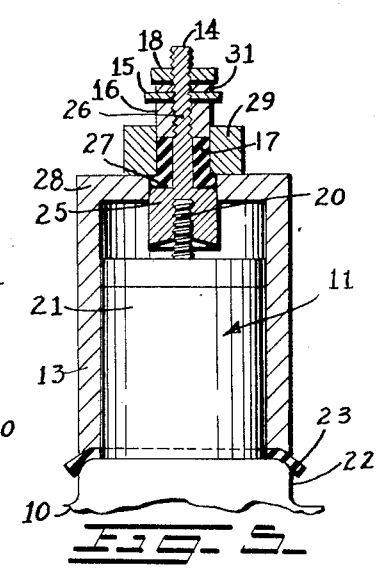
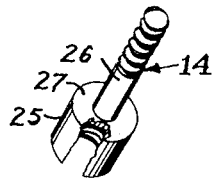
INVENTORS
WILLIAM F. HINES
JOSEPH J. HOLLWIG
BY
ATTORNEY Patented July 19, 1949

2,476,603

UNITED STATES PATENT OFFICE 2,476,603

TERMINAL SEALING CAP FOR REFRIGERATORS

William F. Hines, Dumont, N. J., and Joseph J. Hollwig, Brooklyn, N. Y.

Application April 12, 1946, Serial No. 661,704

6 Claims. (Cl. 174—77)

This invention relates to a terminal sealing cap whereby an electric terminal is sealed and insulated against leakage and against undesired electric contact.

In various fields such as refrigeration and the like it is common to have electric terminals and connections which must be sealed against liquid leakage and the like in addition to being electrically insulated. Accordingly, it is an object of this invention to provide a sealed electric terminal.

It is a further object of this invention to provide a sealing cap for an electric terminal.

It is still another object of this invention to provide an insulated sealed connection for an electric terminal.

Additional objects of this invention as well as its use, construction, and operation will in part be obvious and will in part become apparent from the following disclosure.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is a schematic view of a refrigerator dome having a sealed electric connection thereon according to the present invention.

Fig. 2 is a perspective view of a sealed electric connection per se.

Fig. 3 is a side elevation of an electric terminal adapted to receive a sealing connection thereon according to Fig. 1.

Fig. 4 is a side cross section of the article shown in Fig. 2, showing the internal structure thereof in the untightened condition.

Fig. 5 is a similar view of the article in the tightened condition.

Fig. 6 is a perspective view, partially broken away, of an adaptor according to the previous figures.

Referring to the figures in detail, in Fig. 1 there is shown a refrigerator dome generally designated 10 having at least one electric terminal 11 thereon. The terminal is mounted on the outside of the dome 10, interconnecting with electric equipment conventionally located within the dome and an electric lead 12 which is electrically connected to the terminal. Other electric or refrigeration equipment and devices may optionally be located on and within the dome as desired.

In Figs. 2 to 5, the electric terminal cap 13 is shown in further detail. The terminal connection as shown in Fig. 1 comprises a cap or housing 13 having an adaptor 14, a washer 15, an expander 16, an elastic bushing 17, and other articles as shown in the following figures, the entire structure being secured in position by nut 18. The details of structure are set forth more fully in Figs. 3 to 5.

The terminal post 11 on the dome 10 shown in Fig. 3, comprises an electric post or bolt 20 secured within the dome to an electrical apparatus (not shown), and surrounded for at least a part of its length by a projection or stud 21. At least the upper or exposed end of post 20 is threaded to receive mechanical connections such as a nut or the like. At the base of stud 21 is a shoulder 22 forming a part of the dome structure.

Also shown in Fig. 3 is a flexible washer 23 which passes around the base of stud 21 and rests on shoulder 22. This washer 23 is constructed of a flexible, expandible material such as rubber or the like. In the preferred form of this invention, the washer 23 will be constructed of a synthetic rubber or rubber substitute such as neoprene, which is particularly characterized by being highly resistant to oils and the like, in addition to possessing rubber-like qualities.

In dotted outline, in Fig. 3, there is also shown an adaptor 14 screwed onto post 20. The adaptor, as shown in Figs. 4 and 5 and particularly in Fig. 6 comprises a hollow ended head 25 having an extending bolt or stem 26 thereon. At least the end portion of the bolt 26 is threaded to receive threaded connections as will hereinafter be set forth. At the juncture between the head 25 and the bolt 26 there is a substantially flat shoulder 27. The inside of the hollow head 25 is threaded for its full depth, and is adapted to fit on and threadedly engage post 20 on the dome terminal 11. The depth of head 25 is substantially less than the threaded height of post 20, whereby post 20 is adapted to be secured tightly into the head 25 and to bear against the end of the hollow, forming a secure electrical connection between the post 20 and the adaptor 14.

Mounted around the terminal 11, surrounding stud 21, resting against washer 23 and passing adaptor stem 26 therethrough is a cap 13. This cap comprises a hollow cylindrical casing having an open bottom and a partially closed top 28. The top 28 of the cap extends partially across the end of the cylinder toward the center thereof, and a knob 29 is integrally extending thereabove. Through the center of the end wall 28 there is an opening very slightly larger in diameter than the head 25 of adaptor 14. Knob 29 on top of wall 28 and forming an integral part thereof has an internal opening whose diameter is somewhat smaller than the opening in the top 28. The opening in the top 28 is substantially equal to the diameter of head 25 and which fits snugly thereover.

In the preferred form of the invention a downward curve is provided on the lower open edge 30 of cap 13, whereby a substantially tight fit may be obtained between the cap 13 and the shoulder 22. When washer 23 is pressed between these surfaces, it is apparent that an unusually tight seal can be obtained.

Positioned around stem 26 of adaptor 14 and resting on shoulder 27 is a flexible bushing 17. This bushing, like washer 23 is constructed of a rubber-like material, preferably an oil resistant rubber-like material such as neoprene or the like. The bushing has an external diameter substantially the same as the diameter of the opening in the knob 29, and has an internal diameter to fit snugly around the lower portion of post 26, whereby in its loose condition it fits snugly between the stem 26 and the knob 29 of cap 13

Positioned above the bushing 17 and surrounding stem 26 is an expander 16. This expander is of similar internal and external diameter to bushing 17, and is adapted to bear against substantially the entire upper surface of the bushing. The expander is constructed of a relatively stiff material such as a metal or plastic. In one form of the invention, the expander is constructed of a stiff and relatively non-flexible synthetic plastic.

Located above the expander, in order, are a metal washer 15, optionally a friction washer 31, and a nut 18, all of conventional structure. The nut 18 is adapted to mate with and engage the threaded stem 26 of adaptor 14, whereby it tightens the assembly herein set forth.

In Fig. 4, there is shown the assembly in the loose condition, with the post 20 screwed into the head 25, and with the cap 13 resting loosely on the washer 23 and the nut 18 not tightened. In Fig. 5 there is shown the same structure in the tightened condition. In Fig. 5 the nut 18 is tightly bearing against the washer 31, causing the expander 16 to compress the bushing 17. Adaptor 14 is tight on the post 20, and the shoulder 27 of adaptor 14 is below knob 29. Bushing 17 is compressed tightly against the inside of knob 29 and into the enlarged space within the opening of the top 28, securely and tightly bearing against the cap 13.

The terminal assembly is put together in a simple and straight-forward manner, as shown in the figures. Washer 23 is placed over and around stud 21, as illustrated in Fig. 3, and adaptor 14 is screwed into the post 20. Cap 13 is then placed over the stud and adaptor, and bushing 17, expander 16, washers 15 and 31 and nut 18 are placed on stem 26. It is obvious that cap 13 may be placed in position at a later stage of the assembling operation, as long as it is placed before an article such as washer 15, with a larger diameter than knob 29, is placed in position. When the loose assembly is positioned as described and as shown in the figures, the entire assembly is tightened simply by tightening nut 18. There is thus provided a secure and hermetically sealed electric connection.

An electric lead, such as lead 12 in Fig. 1, may be secured to stem 26 of adaptor 14 above nut 18 by simply adding the nut which normally accompanies the terminal connection. For example, an electric lead may be inserted between washer 15 and washer 31, or alternatively at another position adjacent to an electrically conducting member of the terminal assembly.

The terminal assembly formed according to this invention is characterized by being electrically sound, i. e., thoroughly free from loose connections and free from undesired connections or short circuits. In addition, the terminal assembly is tightly air and liquid-proof, preventing leakage of gas or liquid into or out of the assembly. It effectively prevents leaking of a lubricating liquid or the like from dome 10 through the electric terminal connection, whereby it is useful in providing a permanently sealed electrical device.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new, and desire to secure by United States Letters Patent is:

1. In combination with an externally threaded terminal post and a stud from which the terminal post extends, of a cap enclosing the stud and terminal post, an adaptor for the terminal post threaded thereon and extending through the cap, a rubber bushing on said adaptor and extended into cap, said adaptor having a screw threaded stem extending outwardly of said rubber bushing, a knob on said cap enclosing said bushing, an expander engaging said bushing, and a nut threaded on said stem against said expander.

2. In combination with an externally threaded post which extends longitudinally from a surface, a hollow cap positioned around the post, an adaptor threaded onto the end of the post and passing through an opening in the top of said cap, said cap having an open end adjacent the surface, a resilient insulating washer interposed between the open end of said cap and the surface, said adaptor being formed with a shoulder extended partially into the top opening of said cap, a resilient insulating bushing surrounding said adaptor and engaging against the shoulder thereof, and means for compressing said bushing longitudinally whereby said bushing is compressed to bear tightly against said shoulder.

3. In combination with an externally threaded post which extends longitudinally from a surface, a hollow cap positioned around the post, an adaptor threaded onto the end of the post and passing through an opening in the top of said cap, said cap having an open end adjacent the surface, a resilient insulating washer interposed between the open end of said cap and the surface, said adaptor being formed with a shoulder extended partially into the top opening of said cap, a resilient insulating bushing surrounding said adaptor and engaging against the shoulder thereof, and means for compressing said bushing longitudinally whereby said bushing is compressed to bear tightly against said shoulder, said means comprising an expander positioned on said adaptor adjacent to said bushing, and means for forcing said expander to compress said bushing along said adaptor toward said shoulder.

4. In combination with an externally threaded post which extends longitudinally from a surface, a hollow cap positioned around the post, an adaptor threaded onto the end of the post and passing through an opening in the top of said cap, said cap having an open end adjacent the surface, a resilient insulating washer interposed between the open end of said cap and the surface, said adaptor being formed with a shoulder extended partially into the top opening of said cap, a resilient insulating bushing surrounding said adaptor and engaging against the shoulder thereof, and means for compressing said bushing longitudinally whereby said bushing is compressed to bear tightly against said shoulder, said means comprising an expander positioned on said adaptor adjacent to said bushing, and means for forcing said expander to compress said bushing along said adaptor toward said shoulder, said compression of said bushing also causes it to expand against the inside wall of the top opening of said cap.

5. In combination with an externally threaded post which extends longitudinally from a surface, a hollow cap positioned around the post, an adaptor threaded onto the end of the post and passing through an opening in the top of said cap, said cap having an open end adjacent the surface, a resilient insulating washer interposed between the open end of said cap and the surface, said adaptor being formed with a shoulder extended partially into the top opening of said cap, a resilient insulating bushing surrounding said adaptor and engaging against the shoulder thereof, and means for compressing said bushing longitudinally whereby said bushing is compressed to bear tightly against said shoulder, said means comprising an expander positioned on said adaptor adjacent to said bushing, and means for forcing said expander to compress said bushing along said adaptor toward said shoulder, said means for forcing said expander comprising a nut threaded onto the end of said adaptor and bearing against said expander.

6. In combination with a post which extends longitudinally from a surface, a cap positioned around the post and having a top wall formed with a concentric opening, said cap having an open end adjacent the surface, a resilient washer positioned between the surface and the open end of said cap, said cap bearing against said washer retaining the washer in position between the cap and the surface, an adaptor mounted on the post and having a reduced end extending from said opening, a shoulder on said adaptor between its portions of different diameter extended partially into said opening, a resilient insulating bushing on the reduced end of said adaptor and bearing against said shoulder, and means for longitudinally compressing said bushing along said adaptor, whereby said bushing is forced simultaneously against said shoulder and against the material of said cap surrounding the opening in the top thereby sealing said cap and adaptor against the passage of fluid therebetween.

WILLIAM F. HINES.
JOSEPH J. HOLLWIG.

REFERENCES CITED

The following references are of record in the file of this patent:

UNITED STATES PATENTS

| Number | Name | Date |
| --- | --- | --- |
| 1,168,019 | Liversidge | Jan. 11, 1916 |
| 1,569,385 | Marbury | Jan. 12, 1926 |
| 2,028,942 | Money | Jan. 28, 1936 |
| 2,418,729 | Schemers | Apr. 8, 1947 |